United States Patent Office 3,398,878
Patented Aug. 27, 1968

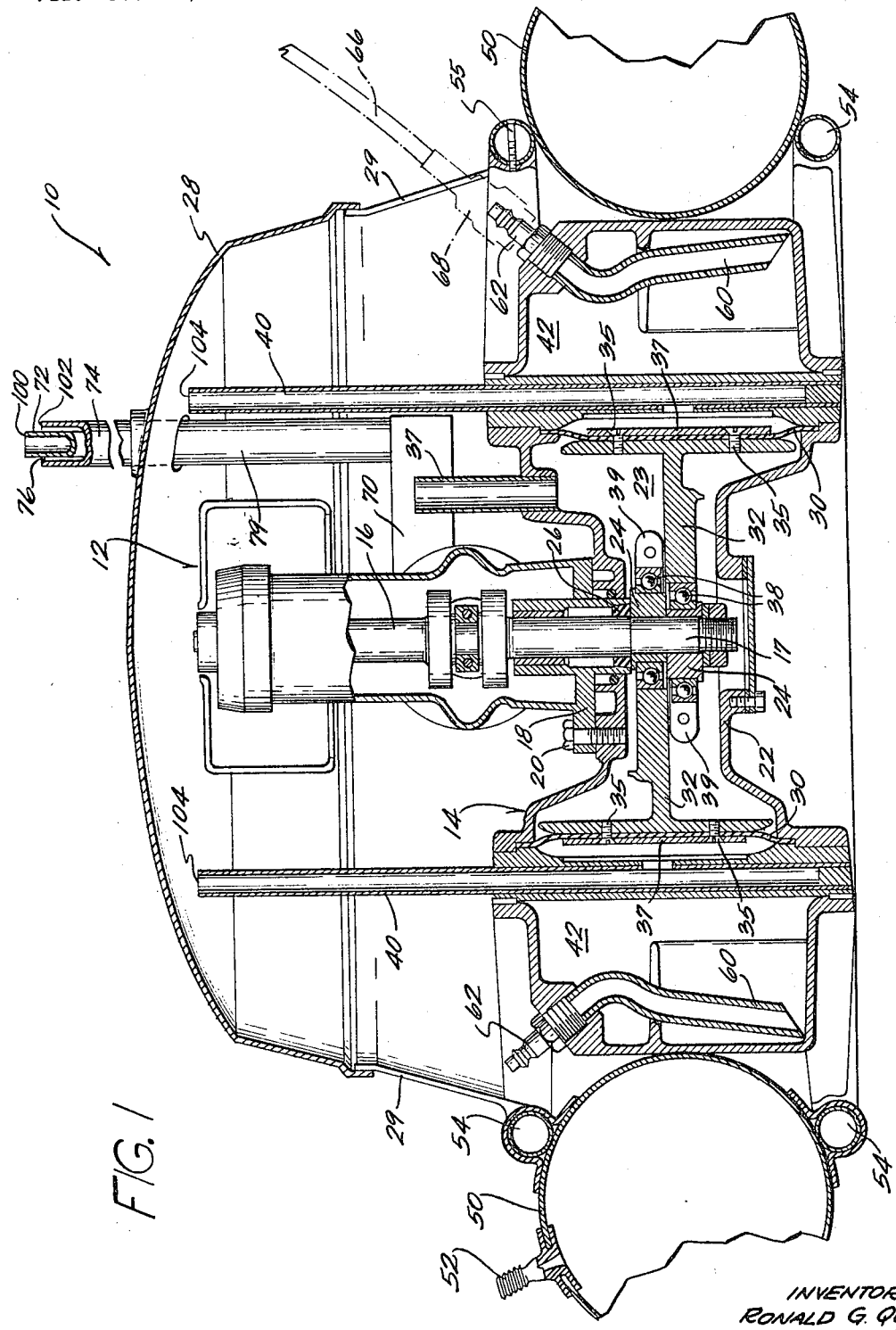

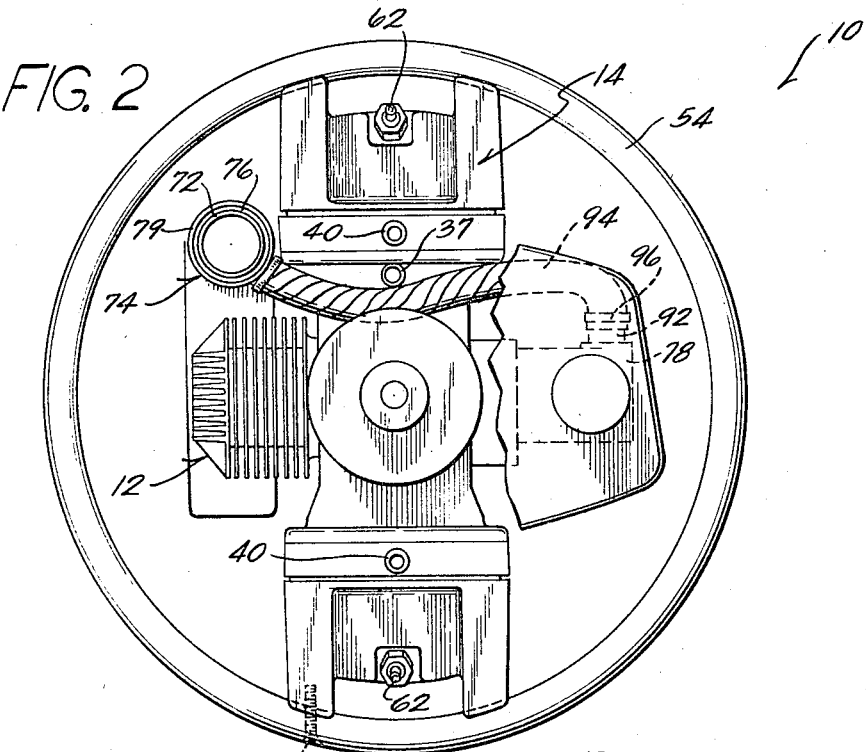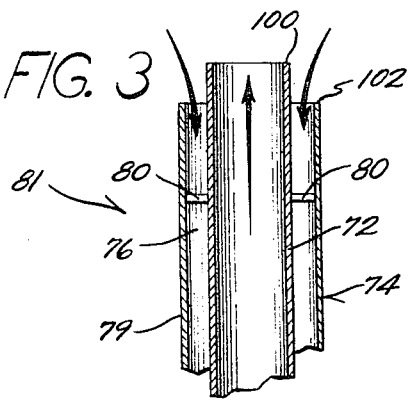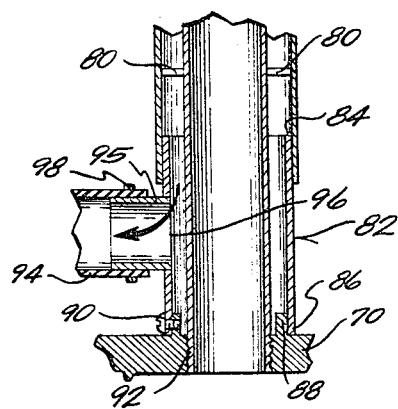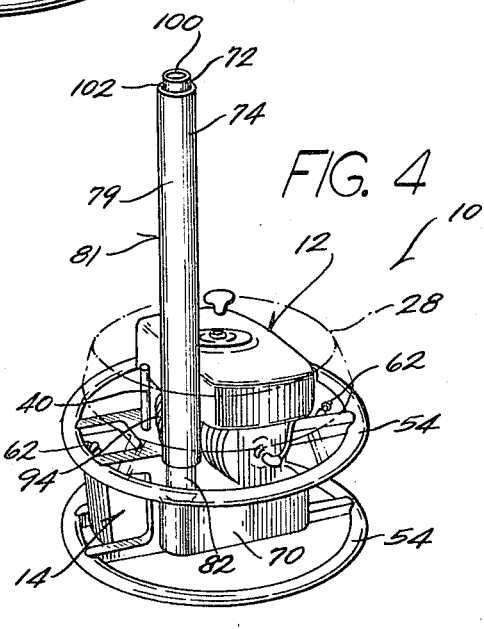

3,398,878
SKIN DIVING APPARATUS
Ronald G. Quiram and Gaylord M. Borst, Galesburg, Ill., assignors to Outboard Marine Corporation, Waukegan, Ill., a corporation of Delaware
Filed Dec. 28, 1965, Ser. No. 516,857
26 Claims. (Cl. 230—56)

ABSTRACT OF THE DISCLOSURE

Disclosed herein is a skin diving apparatus comprising an engine-air compressor assembly including an upright combustion air inlet and exhaust gas pipe and flexible hoses for delivering compressed air. The assembly is supported from a pair of rings which removably receive an inflatable rubber tube to afford flotation of the assembly in water with the compressor portion thereof partially in the water. One of the rings also serves as a base to support the assembly on a solid surface.

---

This invention relates to engines and to combined engines and air compressor arrangements.

An object of the invention is to provide an arrangement for selectively supporting on the ground or other solid surface or floating in water a combined engine and air compressor assembly or device.

Another object of the invention is to provide an engine having an air intake and exhaust pipe arrangement which affords heating of the intake air to the engine, which affords shielding of the exhaust pipe from a user to prevent burn injuries to a user and which can be easily assembled and disassembled when desired.

Another object is to provide an engine and air compressor which provides a supply of compressed air which is not contaminated with exhaust gases of the engine. The combination air compressor and engine includes an engine air intake and exhaust pipe arrangement which affords heating of the intake air to the engine, which affords shielding of the exhaust pipe from a user to prevent burn injuries to a user and which can be easily assembled and disassembled when desired.

Another object of the invention is to provide a floatable engine and air compressor arrangement which affords flotation cooling of the compressor to thereby afford cooling of the compressed air delivered by the compressor.

Other objects, advantages and features will become apparent from the following description and accompanying drawings in which:

FIGURE 1 is a cross sectional view of a combined engine and air compressor arrangement showing various features of the invention;

FIGURE 2 is a plan view of the combined engine and air compressor arrangement shown in FIGURE 1 with the cover removed;

FIGURE 3 is a fragmentary cross sectional view of an exhaust and intake arrangement employed in the engine of the combined engine and air compressor arrangement shown in FIGURE 1; and FIGURE 4 is a perspective view of the combined engine and air compressor arrangement shown in FIGURE 1 and showing the cover in phantom outline.

Referring now to the drawings and more particularly to FIGURE 1, the combined engine and air compressor arrangement or device is broadly identified by the numeral 10 and generally comprises the assembly of a prime mover such as an internal combustion engine 12 connected to an air compressor 14 by any suitable connecting means, such as bolts 20. The internal combustion engine 12 has a crankshaft 16 including an end portion 17 which extends through the engine crankcase 18, through the compressor housing 22 and into a central chamber 23 in the compressor 14. The crankshaft end portion 17 has thereon a pair of adjacent eccentrics 24 which are oppositely oriented or angularly spaced about the crankshaft axis approximately 180° for reasons to be hereinafter discussed. A suitable seal 26 affords sealing between the crankcase 18 and the crankshaft 16. The combined engine and air compressor 14 is provided with a cover 28 which is connected to the compressor housing 22 by suitable mounting brackets 29.

Located in the central chamber 23 of the compressor 14 is a pair of air pumps provided, in the disclosed construction, by oppositely disposed pumping diaphragms or members 30 and oppositely acting crank arms 32. The crank arms are connected to the respective diaphragm members 30 by suitable connecting means, such as one or more screws 35 and connecting plates 37. To afford reciprocation of the crank arms 32 and ultimately oscillation of the diaphragms 30, the crank arms 32 are rotatably mounted on the respective eccentrics 24 by bearings 38 and suitable connecting means 39. The angular spacing of the eccentrics 24, as previously mentioned, affords simultaneous movement of the crank arms 32 in opposite directions to thereby afford simultaneous pumping and suction strokes for the respective diaphragms 30. To prevent pressure build-up in the central chamber 23, the central chamber 23 communicates with the atmosphere through a vent pipe 37 carried on the housing 22.

Air enters the compressor 14 through upstanding pipes or air inlets 40 which extend to adjacent the top of the compressor cover 28. The fresh air enters the inlets 40 and is pumped by the oscillating diaphragms 30 to air storage chambers 42 respectively associated with the diaphragms 30. The valving arrangement for the compressor 14 is conventional and is not specifically shown.

Flotation means are provided for floating the engine 12 and compressor 14 in water to afford cooling of the compressor 14. Although other means can be employed, in the disclosed construction, such means comprises inflatable means having sufficient buoyancy to afford support of the combined engine and compressor device 10 in water and to further provide a bumper for the device 10, together with means for removably mounting the flotation means on one of the engine 12 or compressor 14 to afford holding the flotation means in supporting relation to one of the compressor 14 and the prime mover and to locate the compressor at least partially in the water upon flotation of the assembly.

The inflatable means includes a toroidal-shaped inflatable member 50 having a valve 52 to afford inflation thereof, such as by the compressor 14. The inflatable member 50 has sufficient buoyancy, when inflated, to support the combined engine and compressor device 10 in water. Said means for removably mounting the inflatable member 50 on one of the engine 12 or the compressor 14 includes a pair of identical, spaced, members or annular rings 54 which are of tubular construction, which extend circumferentially around the assembly of the engine and the compressor in generally spaced relation thereto and which are preferably located in planes extending generally transversely of the crankshaft. In the preferred embodiment, the inflatable member 50 is removably mounted to the compressor 14, and the rings 54 are suitably connected to the housing 22 of the compressor 14 by suitable means, such as screws 55. The rings 54 encircle the compressor housing 22 and are axially spaced from each other a distance which is slightly less than axial thickness of the inflatable member 50. When the inflatable member 50 is placed between the annular rings 54 and inflated, the member 50 expands between the rings 54 and securely grips the annular rings 54 to thereby provide a secure connection of the inflatable member to the compressor 14. The member 50 can be easily removed from the compressor 14 by deflating the member 50.

The lower one of the rings 54 also serves as a base for supporting the assembly of the compressor and the engine when the assembly rests on a supporting surface, such as a floor. In this regard, the lower ring or member has a lower surface which extends beneath the lowermost part of the compressor housing. In order to provide stability to the assembly, the compressor does not extend below the bottom of the lowermost ring and is located at least partially below the upper one of the rings 54.

The inflatable member 50 affords sufficient buoyancy to support the engine and compressor device 10 in water so that the compressor 14, including the air storage chambers 42, is partially submerged in the water to provide flotation cooling of the compressor 14 and therefore of the compressed air in the storage chambers 42, thereby affording delivery of cool air to a user. In this regard, the underside of the compressor housing 22 is in contact with the water to afford flotation cooling of the compressor housing 22.

The air stored in the storage chamber 42 is delivered to a user through conduits 60 respectively extending into the chambers 42 and communicating with suitable valves 62 carried on the compressor housing 22. Each of the valves 62 is arranged to afford automatic coupling thereto of an air supply hose or conduit 66 having a complementary coupling part 68 which receives the valve 62 (as shown in phantom outline in FIGURE 1).

As shown in FIGURE 1, the engine 12 has an exhaust manifold or part 70 which communicates with the combustion chamber of the engine 12 and with an exhaust passage or pipe 72 which extends upwardly through and beyond the cover 28. Means are provided for affording heating of the intake air to the engine 12 to thereby improve the engine's efficiency and for providing an exposed surface surrounding the exhaust passage 72 which shields the exhaust pipe from a user to prevent burn injuries to a user of the device 10. In the preferred embodiment, such means comprises an air intake pipe 74, which is supported from the exhaust manifold 70, which does not communicate with the exhaust passage 72 (as shown in FIGURE 3), and which encircles the exhaust pipe 72 to thereby define an engine air intake passage 76 between the walls of exhaust and intake pipes 72 and 74. The intake passage 76 is connected to a carburetor 78 (FIGURE 2) in a manner hereinafter to be described. The hot exhaust gases passing through the exhaust passage 72 afford heating of the engine intake air in the intake passage 76. Furthermore, the exposed surface 79 of the intake pipe 74 shields the exhaust pipe from a user of the device 10 who may contact the intake pipe 74.

Means are provided to afford easy connection and disconnection of the exhaust pipe 72 and the intake pipe 74 to and from the engine 12. Such means comprises internal webs or parts 80 which connect the intake pipe 74 to the exhaust pipe 72 to provide a combined exhaust and intake pipe assembly broadly identified by the numeral 81, together with an intake pipe mounting part 82 having an end 84 which is partially telescopically received within the intake pipe 74 and having an opposite end 86 which fits over or receives an annular lip 88 extending from the exhaust manifold 70. The mounting part 82 is removably secure to the lip 88 by any suitable means such as one or more screws 90. The space between the mounting part 86 and the exhaust passage 72 comprises a part of the intake passage 76. Said connection and disconnection means further includes, on the exhaust pipe 72, a mounting end 92 which is threadedly connected to the manifold 70.

When the mounting part 82 is secured to the manifold 70, as previously described, the exhaust and intake pipe assembly 81 can be easily connected to the engine 10 by simply screwing the exhaust pipe mounting end 92 to the manifold 70, whereupon, the intake pipe 74 partially telescopically receives the mounting part 82. The exhaust and intake pipe assembly 81 can be easily removed or disconnected by simply unscrewing the exhaust pipe from the manifold 70.

The intake passage 76 is communicated with the carburetor 78 through a suitable hose 94 connected to the carburetor 78 and to a mounting flange 95 surrounding an opening 96 in the mounting pipe 92, which opening 96 communicates with the intake passage 76. The hose 94 is clamped to the flange 95 by any suitable means such as clamp 98.

To prevent entrance of exhaust gases into the intake passage 76, exhaust pipe 72 has a discharge end 100 which extends above the combustion air intake end 102 of the intake pipe 74 as shown in FIGURE 3. To prevent contamination of compressor inlet air, the discharge end 100 of the exhaust passage 72 generally extends approximately 30 inches above the water level when the device 10 is floated in water and extends approximately 20 inches above the compressor air inlet ends 104 of the compressor air inlet pipes 40. The combustion air intake end 102 is also located below the exhaust discharge end 100 but substantially above the water, thereby preventing entry of water into the carburetor system of the engine 12.

Various of the features of the invention are set forth in the following claims.

What is claimed is:

1. The combination of an air compressor, an engine operatively connected to, and carried on, said air compressor, inflatable means, and means for removably mounting said inflatable means on one of said engine and said compressor to afford holding said inflatable means in supporting engagement to said one of said engine and said compressor upon inflation of said inflatable means.

2. A combination in accordance with claim 1 wherein said mounting means includes a pair of spaced annular rings carried on said compressor and wherein said inflatable means includes a toroidal-shaped inflatable member engageable with said rings upon inflation of said member to afford connection of said member to said compressor, said inflatable member affording sufficient bouyancy in water to provide support of said compressor and said engine in water.

3. A combination in accordance with claim 2 wherein said compressor includes a chamber for storing compressed air, said chamber being partially submerged upon flotation of said compressor in water to afford flotation cooling of said compressor.

4. A combination in accordance with claim 1 wherein said compressor includes an air inlet and said engine includes an exhaust pipe having a discharge end disposed above said air inlet and includes an air intake pipe surrounding said exhaust pipe to define an air intake passage, said intake pipe having an intake end spaced below said exhaust discharge end.

5. A combination in accordance with claim 4 including means for affording connection and disconnection of said intake pipe and said exhaust pipe to and from said engine.

6. A combination in accordance with claim 5 wherein said engine includes an exhaust manifold and said connection and disconnection means includes a threaded end on said exhaust pipe threadedly received in said exhaust manifold, webs connecting said intake pipe in encircling relation to said exhaust pipe, and a mounting part encircling said exhaust pipe and communicating with said intake passage, said mounting part having an end partially telescopically receivable in said intake pipe.

7. A combination in accordance with claim 6 including an annular lip extending from said manifold and received in the other end of said mounting part, and means for removably securing said mounting part to said lip.

8. A combination in accordance with claim 7 wherein said mounting part includes an opening communicating with the intake passage and includes a mounting flange surrounding said opening.

9. The combination of an air compressor, a prime mover operatively connected to and carried on said air compressor, flotation means, and means for removably mounting said flotation means on one of said prime mover and said compressor to afford holding said flotation means in supporting relation to said one of said prime mover and said compressor and for locating said compressor at least partially in the water upon flotation of said combination.

10. A combination in accordance with claim 9 wherein said engine includes an exhaust pipe and means for heating the intake air to said engine and for shielding said exhaust pipe from a user of the engine.

11. An engine in accordance with claim 10 wherein said heating means includes an air intake pipe disposed in encircling relation to said exhaust passage to provide an intake passage between said exhaust pipe and said intake pipe, whereby exhaust gases passing through the exhaust pipe are effective to heat said intake passage and whereby said intake pipe has an outer surface which shields said exhaust pipe from a user of the engine.

12. An engine in accordance with claim 11 wherein said intake pipe has an intake end and said exhaust pipe has a discharge end which extends above said intake end of said intake pipe.

13. An engine in accordance with claim 11 including means for affording connection and disconnection of said intake pipe and said exhaust pipe to and from said engine.

14. A combination in accordance with claim 13 wherein said engine includes an exhaust manifold and said connection and disconnection means includes a threaded end on said exhaust pipe threadedly received in said exhaust manifold, webs connecting said intake pipe in encircling relation to said exhaust pipe, and a mounting part encircling said exhaust pipe and communicating with said intake passage, said mounting part being removably securable to said manifold and having an end partially telescopically receivable in said intake pipe.

15. The combination of a compressor having an air inlet and an engine operatively connected to, and carried on, said compressor, said engine having an exhaust gas pipe including an exhaust gas discharge end extending above said compressor air inlet and having an engine air intake pipe encircling said exhaust gas pipe and having an engine air intake end below said exhaust gas discharge end.

16. The combination of an assembly comprising a compressor including a housing, a pair of oppositely extending pumping cylinders on said housing, and a pumping member movable in each of said pumping cylinders, and an internal combustion engine including a crankcase extending from said housing, an engine cylinder extending from said crankcase, and a piston reciprocable in said cylinder, and a crankshaft in said crankcase and in said housing perpendicular to all of said cylinders and connected to said piston for rotation of said crankshaft in response to reciprocation of said piston and connected to said pumping members for pumping operation of said pumping members in response to rotation of said crankshaft, and a pair of members extending circumferentially around said assembly in generally spaced relation thereto, located in spaced planes transverse to said crankshaft and connected to said compressor, one of said members having a lower surface located at or below the lowermost part of said compressor.

17. A combination including an assembly comprising an air compressor having two pumping cylinders and an internal combustion engine mounted on said compressor and operatively connected to said compressor and a base connected to said assembly and adapted for support of said assembly on the supporting surface, said base comprising upper and lower rings extending circumferentially around said assembly and in generally spaced relation thereto, said compressor being located at least partially below said upper ring and above the bottom of said lower ring.

18. The combination of an assembly comprising an internal combustion engine having a crankshaft and a piston connected to said crankshaft and an air compressor below said engine and having a plunger connected to said crankshaft in spaced relation to the connection of said engine piston to said crankshaft and operatively connected to said air compressor, and a pair of members extending circumferentially around said assembly in generally spaced relation thereto, located in spaced planes transverse of said crankshaft, and connected to said compressor.

19. A unit according to claim 17 in which said base includes a supporting float through which at least a part of the lower case and compressor cylinders extend.

20. A unit according to claim 19 in which the compressor cylinders are exposed below the level of water in which the supporting float is disposed, whereby to be cooled by such water.

21. A combination in accordance with claim 9 wherein said air compressor includes two air pumps.

22. A combination in accordance with claim 21 including separate flexible air supply hoses extending from each of said air pumps.

23. A combination including an assembly comprising an air compressor and an internal combustion engine mounted on said compressor and operatively connected to said compressor, and a base connected to said assembly and adapted for support of said assembly on the supporting surface, said base comprising upper and lower rings extending circumferentially around said assembly and in generally spaced relation thereto, said compressor being located at least partially below said upper ring and above the bottom of said lower ring.

24. The combination of an assembly comprising an internal combustion engine having a crankshaft and a piston connected to said crankshaft and an air compressor below said engine and having a plunger connected to said crankshaft in spaced relation to the connection of said engine piston to said crankshaft, and a pair of members extending circumferentially around said assembly in generally spaced relation thereto, located in spaced planes transverse of said assembly, and connected to said assembly.

25. The combination of an assembly comprising a prime mover and an air compressor connected to said prime mover and having two pumping cylinders, air inlet means respectively connected to said pumping cylinders, a pair of flexible conduits separately respectively connected to said cylinders to afford supply of air from one of said cylinders to one of said conduits independently of supply of air from the other of said cylinders to the other of said conduits, flotation means, and a base connected to said assembly for support of said assembly on a supporting surface, said base including means for removably mounting thereon said flotation means so as to support said assembly on water.

26. The combination of an assembly comprising a prime mover having an output shaft and an air compressor connected to said prime mover and having two pumping cylinders, air inlet means respectively connected to said pumping cylinders, a pair of flexible conduits separately respectively connected to one of said conduits independently of supply of air from the other of said cylinders to the other of said conduits, and a base connected to said assembly and adapted for support of said assembly on a supporting surface, said base comprising a ring secured to said compressor, located in a plane tranverse to said output shaft and having a lower surface located at or below the lowermost part of said compressor.

References Cited

UNITED STATES PATENTS

| | | | |
|---|---|---|---|
| 595,552 | 12/1897 | Banki et al. | 123—122 |
| 781,678 | 2/1905 | Richwood | 230—170 |
| 1,032,582 | 7/1912 | Barnard | 123—122 |
| 1,920,371 | 8/1933 | Franke | 103—87 |
| 2,622,788 | 12/1952 | Ramclow | 230—185 |
| 2,685,404 | 8/1954 | Wohlmeyer | 230—56 |
| 3,273,507 | 9/1966 | Handford | 103—87 |

ROBERT M. WALKER, *Primary Examiner.*

UNITED STATES PATENT OFFICE
CERTIFICATE OF CORRECTION

Patent No. 3,398,878                                    August 27, 196

Ronald G. Quiram et al.

It is certified that error appears in the above identified patent and that said Letters Patent are hereby corrected as shown below:

Column 2, line 7, "aproximately" should read -- approxima---. Column 6, lines 14 and 15, cancel "and operatively connec to said air compressor,".

Signed and sealed this 3rd day of March 1970.

(SEAL)
Attest:

Edward M. Fletcher, Jr.
Attesting Officer

WILLIAM E. SCHUYLER, JR
Commissioner of Patents